UNITED STATES PATENT OFFICE.

MICHAEL BOOG, OF NEW YORK, N. Y.

COMPOSITION OF MATTER FOR MAKING IMITATIONS OF STALACTITES AND GROTTO-WORK.

SPECIFICATION forming part of Letters Patent No. 371,027, dated October 4, 1887.

Application filed June 28, 1887. Serial No. 242,730. (No specimens.)

*To all whom it may concern:*

Be it known that I, MICHAEL BOOG, a citizen of the United States, residing at the city of New York, in the county of New York and State of New York, have invented a new and useful Composition of Matter to be Used in Making Imitations of Stalactites and Grotto-Work, of which the following is a specification.

My composition consists of the following ingredients, combined in the following proportions, viz: Hydraulic cement, forty parts; plaster-of-paris, twenty parts; sand, ten parts; mica broken in small fragments, ten parts; iron-dust, ten parts; linseed-oil, ten parts. All these ingredients I mix with enough water to make the mass of about the consistency of ordinary mason's plaster. Then, having made a frame of wire of any desired shape, I take linen or cotton rags, and having smeared them with the plastic composition I wind them around the wires until a sufficient body has been obtained. I then apply the composition, still in a plastic state, to the outside of the body thus obtained with any well-known and convenient tool, so that the whole structure shall imitate a grotto in miniature, with stalactites, stalagmites, and recesses. The composition is then allowed to set and soon becomes artificial stone of great durability. On account of this composition being water-proof, it may not only be used to make ornaments for the mantel-piece or table and the like, but also for ornamentation in aquariums and fountains and in similar places.

What I claim as my invention, and desire to secure by Letters Patent, is—

The herein-described composition of matter to be used for making imitations of stalactites and grotto-work, composed of hydraulic cement, plaster-of-paris, sand, mica, iron-dust, and linseed-oil, in the proportions specified.

In witness whereof I hereunto set my hand in presence of two witnesses.

MICHAEL BOOG.

Witnesses:
C. E. McDONALD,
FREDK. W. RUBIEN.